April 30, 1946.  C. W. WILLITS  2,399,529
PAPER CUTTER
Filed July 31, 1944.
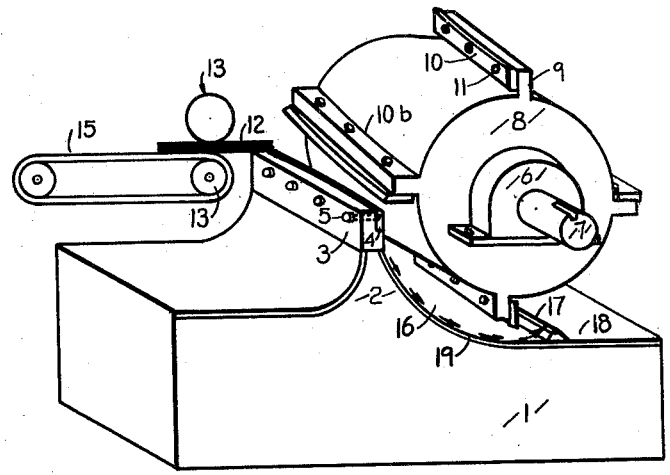
FIGURE 1
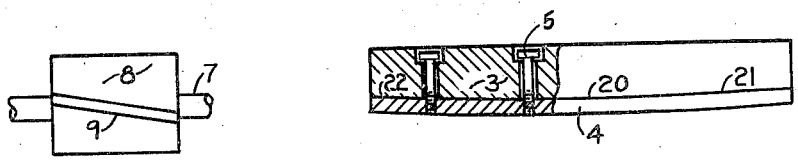
FIG. 2  FIGURE 3
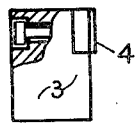 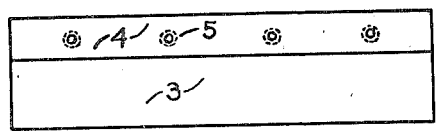
FIG. 5  FIGURE 4
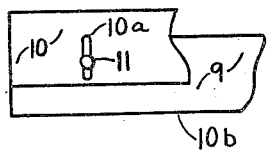
FIG. 6
INVENTOR
CHARLES W. WILLITS
BY
Robert E. Woodhams
ATTORNEY Patented Apr. 30, 1946

2,399,529

UNITED STATES PATENT OFFICE 2,399,529

PAPER CUTTER

Charles W. Willits, Saginaw, Mich.

Application July 31, 1944, Serial No. 547,351

10 Claims. (Cl. 164—68)

This invention relates to a machine for cutting nonmetallic materials, such as paper, into small pieces or strips and particularly contemplates a machine which will do so rapidly and effectively, which will thoroughly stir and mix the cut pieces as a by-product of the cutting operation, and which will be easy to maintain with a minimum of regrinding of the cutting elements.

For the purpose of shredding sheet-like nonmetallic, materials, such as paper, or certain plastics, there are now on the market various types of machines which, though effective for such purposes, insofar as I am aware they either have a high original cost, a high maintenance cost in that their knives dull rapidly and are expensive to resharpen, or their operation is not particularly satisfactory. Further, some of them discharge the material from the cutting operation merely as bunches of cut strips so that in certain processes, as the making of excelsior, it is necessary to stir and mix the strips as a separate and additional operation. It is the purpose of this invention to reduce both of these items of expense by reducing the frequency of resharpening operations, by making this easier to accomplish when it does become necessary and by causing the stirring and mixing of the strips to occur immediately following the cutting action as a by-product thereof.

It is further desirable to provide such a machine which will have a wide range of applications. It should be able to cut effectively not only paper and plastics in sheet form, but should also be able to cut into small pieces such materials as cloth scraps and textiles generally, wood veneer or small boards, crumpled paper or crumpled textile material, plastic rods or bars used to make plastic pellets for molding, and many others similar. Further, it will be evident that although the primary intention of this machine is for cutting non-metallic materials as indicated, its use is not limited thereto and it will also cut thin metal sections such as metal sheets, metallic foil or thin paper and metal foil laminate. Since all of these materials will have different cutting characteristics, the machine should combine great strength and considerable weight with good adjustment control and clean, precise cutting by a sharp edge with a slicing motion.

It is accordingly a major object of my invention to construct a cutter and shredder which will be effective and rapid and yet easy and economical in both original cost and maintenance.

It is a further object of my invention to construct a cutter and shredder which will comprise simple and sturdy parts yet which will cut through relatively thick layers of material with comparative ease and will do so cleanly.

It is a further object of my invention to construct a cutter and shredder which will operate rapidly and cleanly and which will require resharpening of its knives relatively infrequently.

It is a further object of my invention to construct a cutter and shredder which will thoroughly mix and stir the cut strips into a mass immediately upon discharge from the cutting elements and without substantial additional equipment.

It is a further object of my invention to provide a cutter as aforesaid which will be effectively applicable to a wide variety of materials.

In the disclosure and explanation hereinafter following, I have selected the cutting of paper into strips for the making of excelsior, or for paper mill raw stock feed, as an example of a typical use of my machine. However, it should be clearly understood that while I mention only the cutting of paper hereinafter, it is for illustrative purposes only and my machine is quite applicable to the cutting or shredding of other materials as above outlined.

In most devices for the purposes herein concerned, there is either great expense in maintaining them in efficient operating condition or the operation is deficient in some important respect. In the revolving disc type the knife sometimes revolves too slowly near the center to cut certain materials effectively, and near the perimeter it is relatively unsupported and may tend to spring back away from the bed knife. In the chopper type, the knife hits the paper to be cut suddenly and abruptly, requiring either that the construction throughout be heavy or that the thickness of paper cut at any one stroke be small. Also this type, in part because of its greater size and weight, is more expensive to make and run. In both the "lawnmower" type of cutter, having a curved cutting blade, and the slitter type, having a large number of intermeshing cutting disks, the work produced is good, but these have expensive parts, and require both careful original adjustment and precise maintenance, so that they are expensive both in original cost and in operation.

In my improved cutter, I secure the accuracy and cleanness of cutting normally shown by the disk and lawnmower types, the large capacity of the lawnmower type, the simplicity of construction and ease of maintenance of the disk and chopper types, and the low original cost of the disk type. The features by which these improved results are obtained are set forth and explained completely in the hereinafter presented specification and are illustrated by the accompanying drawing.

In the drawing:

Figure 1 shows an oblique view, partially schematic, of my improved cutter.

Figure 2 shows schematically a side view of the drum and the position of mounting a knife thereon.

Figure 3 shows a detail partially sectioned top view of the bed knife and its support.

Figure 4 shows a detail view of the bed knife and its support from the side toward the drum.

Figure 5 shows a detail partially sectioned end view of the bed knife and its support.

Figure 6 shows a detail broken view of the knife and knife support.

Referring now to the drawing, and particularly to Figure 1, there is shown a base 1 having an upward extension 2 thereon. This upward extension mounts the bed knife support 3 on which is mounted the bed knife 4. A suitably constructed bearing member 6 is mounted in any convenient manner, by means not shown, for the support and proper positioning of drive shaft 7 and knife supporting drum 8 in position fixed with respect to the bed knife 4. The drum 8 has spaced equi-distant around its circumference a plurality of knife supporting members 9 which adjustably carry the cutting blades 10. Bearing member 6 is, of course, so placed that when the drum rotates the cutting blades 10 will clear the bed knife 4 by an amount proper for cutting of the strips.

The material to be cut, such as paper, is represented schematically at 12. It is fed to the cutter in a series of sheets whose number will depend upon the size and strength of the machine, and upon the thickness and toughness of the said material. This is fed in any convenient manner, as by a conveyor belt 15, through convenient and conventional guide means, as the guide rolls 13, across the bed plate 3 and between the cutting elements. The speed of the conveyor will obviously be timed, as by a gear train or by gears and chains, to feed the material to be cut at such a speed in relation to the speed of the knives that it will be cut in the desired widths. This speed relationship can evidently be made adjustable by any of several well known speed adjustment means to control the widths of the strips as desired.

The foregoing describes the general construction and operation of the machine. Hereinbelow is disclosed the particular details of improvement within the described general construction which constitutes my invention and which I believe to be new.

Referring to Figure 1, it will be observed that the upper surface 19 of the supporting base 1 extends in a curved manner from the face of the bed-knife-support 3 and is approximately equi-distant from the surface of the knife carrying drum 8 throughout the quadrant of the latter immediately following the cutting point so as to form a chute or partial duct 16 beginning at the cutting elements and ending at the baffle 17. This partial duct substantially contains the air carried around by the knife supports 9 in the manner of a blower and causes it to move rapidly through the partial duct 16. If the duct is provided with side walls it will contain the air more completely and provide a stronger blower effect. Still greater blower effect may be had by providing openings through the ends of the drum near its axis and further openings through the periphery of the drum. This rapid movement of the air, together with the direct impulse of the knives and knife supports, causes the cut pieces of paper to move rapidly away from the cutting point and to discharge from the cutting machine at high velocity. This rapid movement, carried to a considerable distance by the said blower effect, carries the cut pieces well clear of the cutting machine and also causes them to be well stirred and mixed by the time they come to rest. The baffle 17 placed at the end of the partial duct 16 greatly improves this action. The baffle is placed as shown in the drawing across said partial duct 16 and extends from the said surface 19 substantially parallel to a vertical line drawn through the axis of the drum. If the machine is placed in a position other than that shown in the drawing the positioning of this baffle may be better described as extending from said surface 19 in a direction approximately parallel to a line drawn from the axis of the drum substantially perpendicular to the surface 19 and meeting said surface at a point closely adjacent said baffle. The pieces of paper, sometimes only partially broken apart after the cutting operation, are thrown against the baffle at a high velocity and there completely broken apart. In some cases such as when cutting tissue papers or wax papers, very little separation takes place before the cut papers strike the baffle and most of it occurs then and by reason thereof. In all cases, this mechanical separation of the strands, together with the turbulence caused in the air stream by the baffle, substantially furthers the complete and thorough separation of the individual strands and their stirring and mixing into an evenly constituted and resilient mass. This resiliency is of particular value when the cut papers are to be used as excelsior, and the thorough separation of the bunches is of value in other purposes such as when the papers are to be used as partial raw material in a paper mill.

Referring now to the cutting elements, hitherto mentioned only generally, attention is first called to the problem involved. In the usual chopper type of machine, where the cutting blade is placed parallel to the axis of the rotating drum, the action is sometimes ragged, it requires heavy and expensive equipment, and wear may be high if the operation is on substantial thicknesses of material. However, whenever the blade is placed at an angle to the axis of the drum, then it is conventionally curved in the manner of the common lawnmower blade and this is expensive to make and difficult to adjust accurately. In my solution of this problem I place the knife support 9 along the face of the drum at a small angle to the axis of the drum, such at 2 inches of circumferential difference between the ends of a 14 inch knife. The face of the support is straight and the outer edge is straight but the inner edge will be curved to fit the surface of the drum. Therefore, it will carry a blade 10 which is rectangular in all respects except only such non-rectangular grinding as is desirable for the cutting edge. Said blade may be fastened in any convenient manner as bolts 11 and made adjustable by slot 10a. This positioning of the knife support 9 at an angle to the axis of the drum will place the radially outer, or cutting edge of the blade slightly farther from the axis of the drum at its two ends than in the middle. To meet this difference in spacing, the bed knife support 3 is carefully machined along its face backing the bed knife, namely along line 22, 20, and 21 in Fig. 3, in an elliptical curve corresponding to differences in radial extension of the cutting edge of the knife 10 from the axis of the drum 8. Otherwise stated, in the curve followed by line 22, 20 and 21, all points therealong, as the ends 21 and 22, are as far back of a theoretical line extending in both directions from the mid-point 20 and parallel to the axis of rotating drum 8 as the corresponding points on the cutting blade 10 extend radially outwardly of a similar line parallel to the axis of said drum, extending in both directions from the mid-point of the said knife blade. Thus the cutting knife will clear the bed knife properly and the cutting will be clean and accurate. It will, of course, be in a slightly curved line but this is usually immaterial.

With the bed knife support 3 thus carefully machined to the proper curve, the bed knife 4 itself may be made entirely rectangular and ground in a wholly rectangular manner. Since the curve 22, 20, and 21 will never be great in a machine of usual size, the bed knife will easily bend enough to fit snugly against its support and will readily bend to follow, and itself assume the same curve. The bed knife may be held in place in any convenient manner, but I prefer to provide openings through the bed knife support and then to tap the bed knife itself so that bolts may extend from the back of said support and directly engage the bed knife to hold same tightly in place without any obstructions extending beyond its face. It will be observed that by making the bed knife rectangular and acquiring the necessary curve solely by bending it when mounting it, there are four corners equally available as a cutting edge. Thus the bed knife may be merely turned over instead of resharpening when it dulls until all four corners are used, and then the resharpening is only of a straight and rectangular bar which may be easily and rapidly ground on simple equipment and by any ordinary workman.

It will be obvious that many variations in the above disclosed equipment will at once suggest themselves to those interested in the art and especially to those interested in various slightly different fields involving this general problem, but inasmuch as the foregoing disclosure is illustrative only and the principle of the invention is broad and capable of many applications, these variations will all come within the scope of the appended claims excepting only where the claims themselves expressly limit otherwise.

Having thus completely described and illustrated my invention, I claim:

1. In apparatus for shredding non-metallic material of relatively greater length than thickness, the combination: a base member; a rotating drum mounted fixedly with respect thereto; a plurality of straight-edge blade members mounted on said drum at an angle to the axis of said drum; a bed knife support mounted on said base member and presenting a curved face toward said drum; a normally rectangular bed knife supported by said bed knife support and held thereagainst out of its normal shape for forming an elliptically curved cutting edge corresponding to the cutting line made by each of the blade members through a plane including said axis; a wall extending from said bed knife support partially around said drum in the direction of its rotation and spaced from the surface of said drum sufficiently to be cleared by said blade members; and a baffle at the end of said wall partially obstructing this space between said wall and the surface of said drum but of sufficiently limited extent to be cleared by said blade members; means rotating said drum and means feeding material to be cut to the cutting elements.

2. In apparatus for shredding material of relatively greater length than thickness, the combination: a base member; a rotating drum mounted fixedly with respect thereto; a plurality of blade members mounted on said drum and extending outwardly from the surface thereof; a bed knife supported by said base member; a member having a surface extending from said bed knife partially around said drum in the direction of rotation of said drum and spaced from said drum a distance sufficiently greater than the radial extension of said blade members from the surface of said drum to provide clearance between said blade members and the surface of said member; and a baffle at the end of said surface positioned substantially parallel to a vertical line through the center of said drum partially obstructing the space between said surface and said drum but of sufficiently limited extent to be cleared by said blade members.

3. In apparatus for shredding material, the combination: a base member; a rotating drum mounted fixedly with respect thereto; a plurality of straight-edge blade members mounted on said drum at an angle to the axis of said drum; a bed knife support mounted on said base member and presenting a curved face toward said drum; a rectangular bed knife mounted on said bed knife support and held thereagainst out of its normal shape to form a curved cutting edge corresponding to the cutting line made by each of the blade members; means rotating said drum; means conveying the material to be cut between the cutting elements.

4. In apparatus for shredding material, the combination: a rotating drum and means supporting and driving same; a plurality of cutting blade support members extending outwardly from the surface of said drum and placed at an angle to the axis thereof; a cutting blade on each of said supports having its radially outermost edge defining a straight line; a bed knife support having its knife supporting face defining a curve in a vertical plane and a normally rectangular bed knife affixed thereto and distorted to follow said curve; means holding said bed knife against said bed knife support.

5. In apparatus for cutting sheets of paper and the like into strips, the combination: means supporting a cutting blade having a straight-line cutting edge and causing same to move around an axis, said edge being at an angle to said axis; support means fixed with respect to said axis supporting a bed knife and having a vertical surface adjacent the path of said cutting blade defining a curve by its intersection with a horizontal plane; a bed knife held against said support means and assuming the shape of said curve; means holding said bed knife against said support means.

6. In apparatus for cutting sheets of paper and the like into strips, the combination: means supporting a cutting blade having a straight-line cutting edge and causing same to move at least partially around an axis; support means fixed with respect to said axis supporting a bed knife and having a surface perpendicular to a plane through said axis defining a curve on said plane; a bed knife held against said support means and following said curve.

7. In apparatus for shredding material, the combination: a rotating member having an outwardly extending blade carrying member and a blade carried thereon; a bed knife positioned for close clearance of said blade; a member having a curved air impervious surface extending from said bed knife and approximately following a segment of a theoretical circle concentric with the axis of said rotating member.

8. In apparatus for cutting material, such as paper, the combination: a knife movable around an axis and non-parallel therewith; a bed knife having normally a straight line edge; means when said bed knife is in an operative position causing its cutting edge to define a curve lying substantially in a plane which includes said axis.

9. In cutting means: a knife supporting means defining a curve by its knife supporting surface; a normally rectangular knife held against said surface and distorted to assume said curve; means holding said knife against said supporting means.

10. In apparatus for shredding material of relatively greater length than thickness, the combination: a base member; a rotating drum mounted fixedly with respect thereto; a plurality of blade members mounted on said drum and extending outwardly from the surface thereof; a bed knife supported by said base member; a guide member having a guide surface extending from said bed knife partially around said drum in the direction of rotation thereof and spaced from said drum a distance sufficiently greater than the radial extension of said blade members from the surface of said drum to provide clearance between said blade members and the surface of said guide member; a baffle near the end of said guide surface positioned substantially parallel to a line from the center of said drum to a point on said guide surface closely adjacent to said baffle and substantially perpendicular to said guide surface, which baffle partially obstructs the space between said surface and said drum but is of sufficiently limited extent to be cleared by said blade members.

CHARLES W. WILLITS.